INVENTORS
OLIVER P. M. GOSS
WORTH C. GOSS
BY
Cook + Robinson
ATTORNEY

Sept. 11, 1934. O. P. M. GOSS ET AL 1,973,204
BORING MACHINE
Filed Dec. 20, 1933  10 Sheets-Sheet 3

INVENTORS
OLIVER P. M. GOSS
WORTH C. GOSS
BY
Cook + Robinson
ATTORNEY

Sept. 11, 1934.  O. P. M. GOSS ET AL  1,973,204
BORING MACHINE
Filed Dec. 20, 1933   10 Sheets-Sheet 4
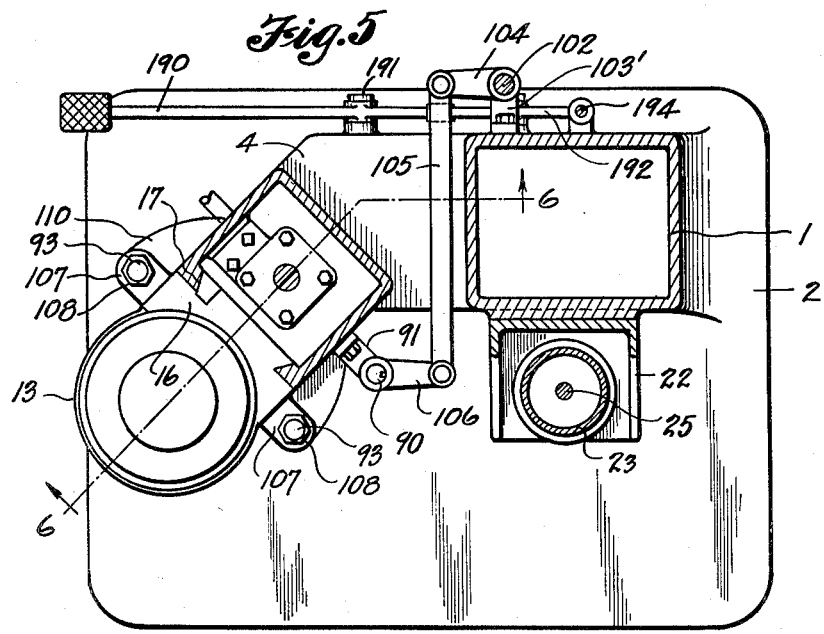
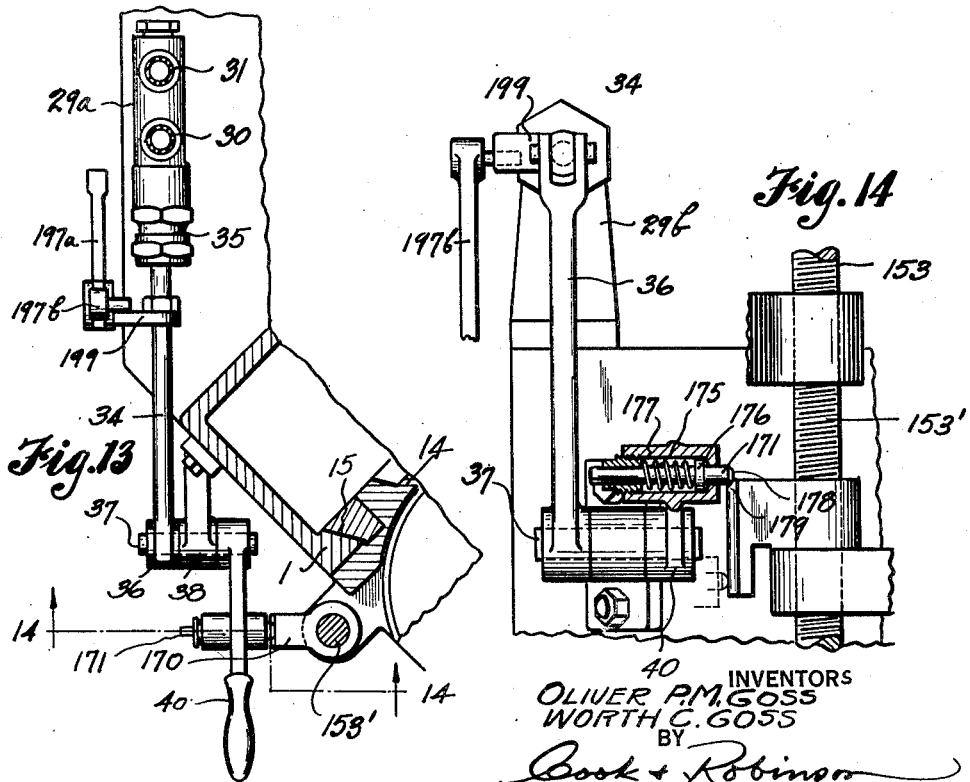
INVENTORS
OLIVER P.M. GOSS
WORTH C. GOSS
BY
Cook & Robinson
ATTORNEY Sept. 11, 1934.   O. P. M. GOSS ET AL   1,973,204
BORING MACHINE
Filed Dec. 20, 1933   10 Sheets-Sheet 5

INVENTORS
OLIVER P. M. GOSS
WORTH C. GOSS
BY
Cook & Robinson
ATTORNEY

Sept. 11, 1934.    O. P. M. GOSS ET AL    1,973,204
BORING MACHINE
Filed Dec. 20, 1933    10 Sheets-Sheet 6

INVENTORS
OLIVER P. M. GOSS
WORTH C. GOSS
BY
Cook & Robinson
ATTORNEY

Sept. 11, 1934.  O. P. M. GOSS ET AL  1,973,204
BORING MACHINE
Filed Dec. 20, 1932   10 Sheets-Sheet 7
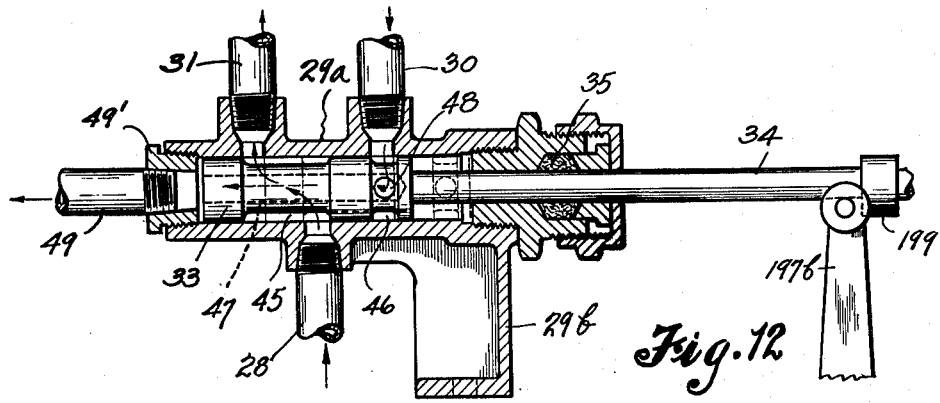
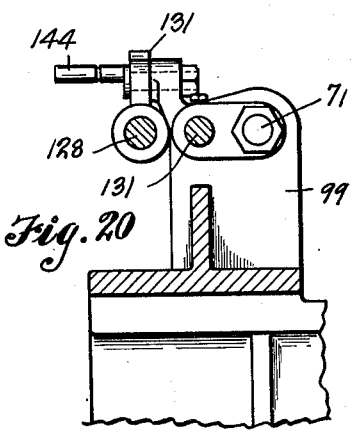
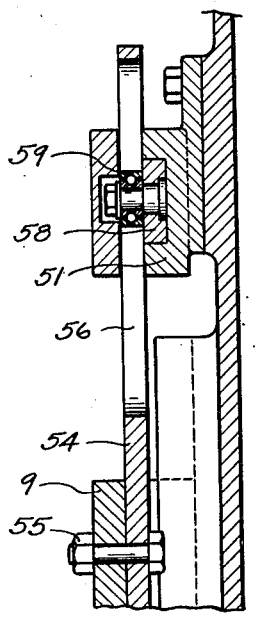
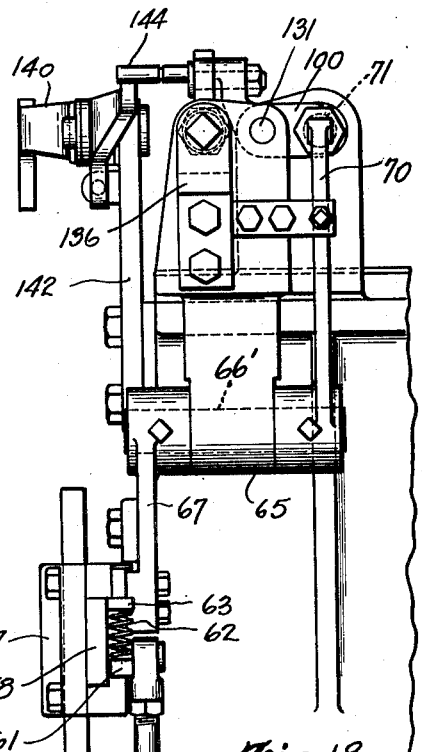
INVENTORS
OLIVER P. M. GOSS
WORTH C. GOSS
BY
Cook + Robinson
ATTORNEY

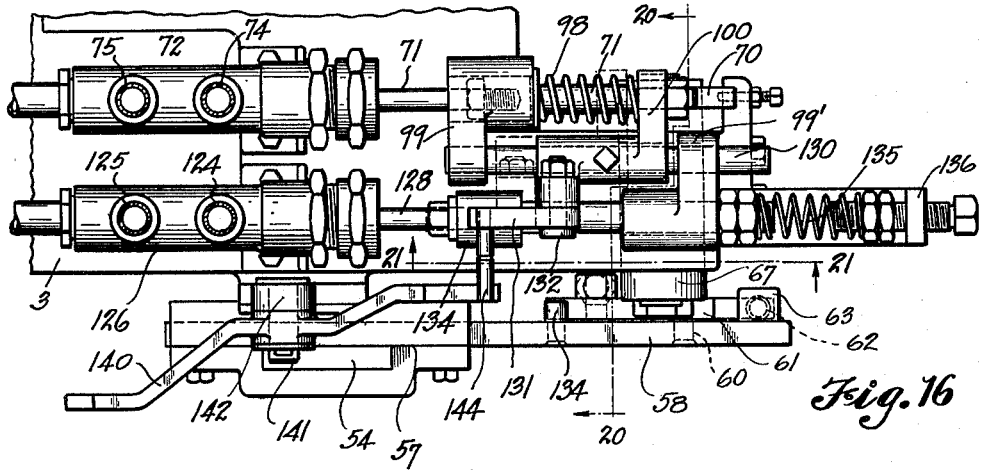
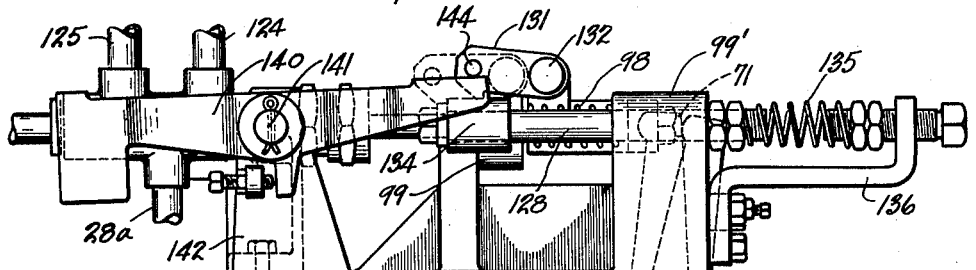
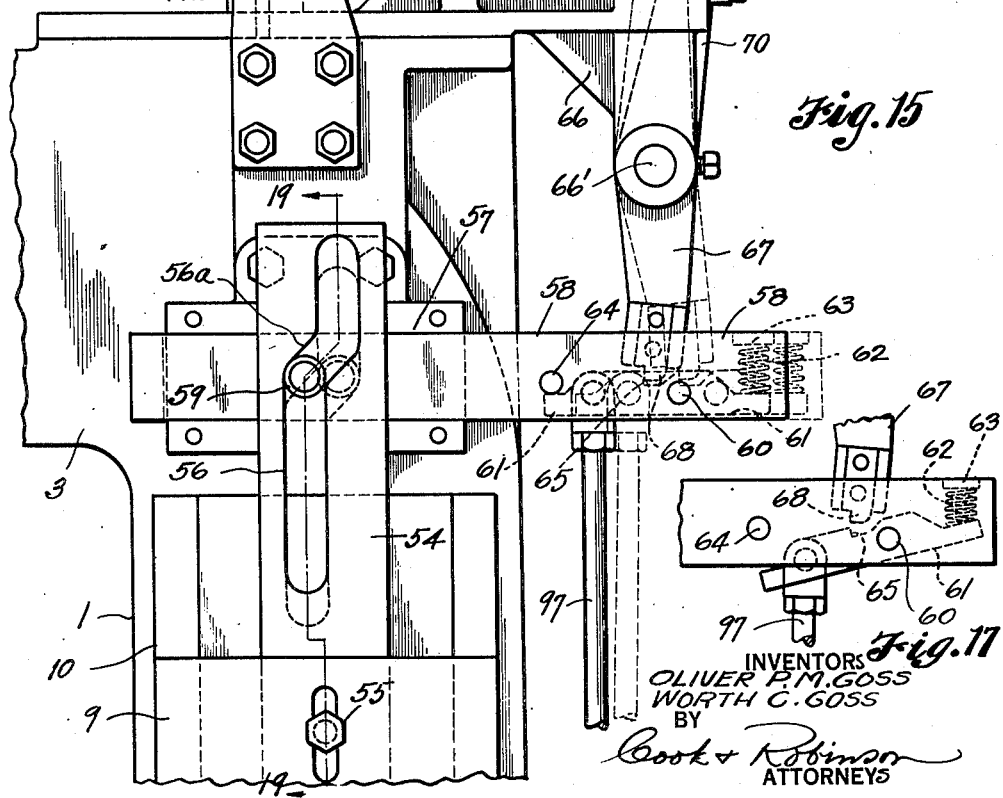

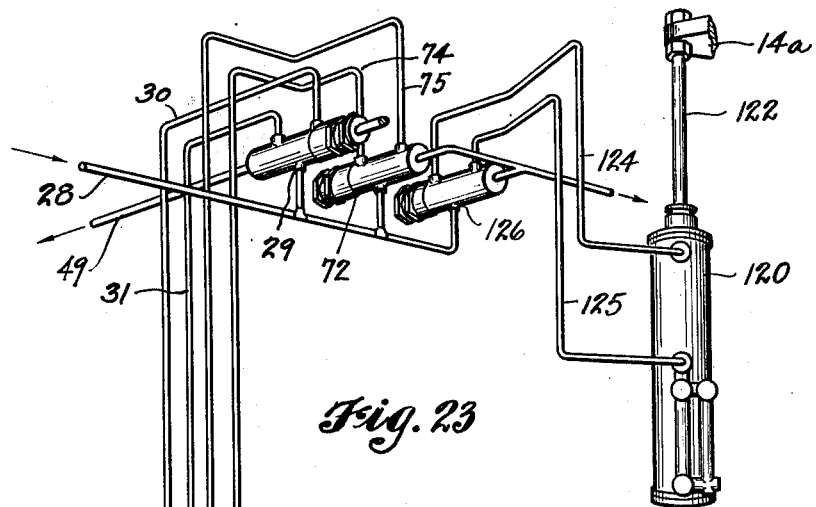
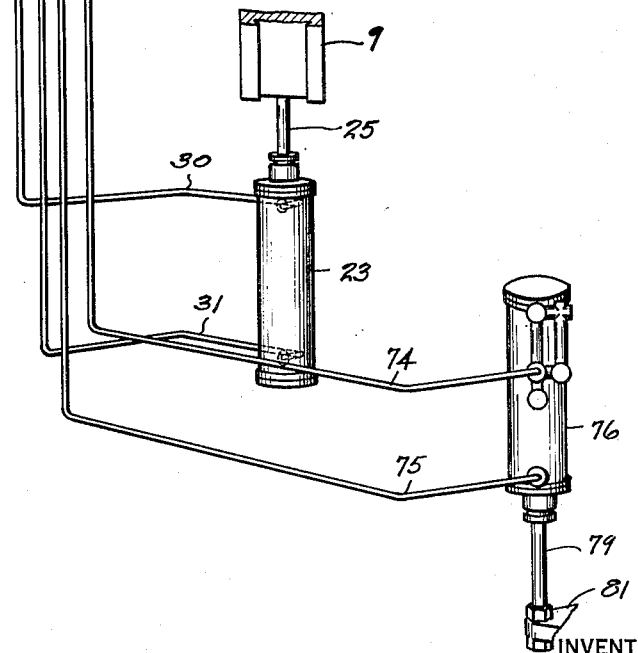

Sept. 11, 1934.    O. P. M. GOSS ET AL    1,973,204
BORING MACHINE
Filed Dec. 20, 1933    10 Sheets-Sheet 10
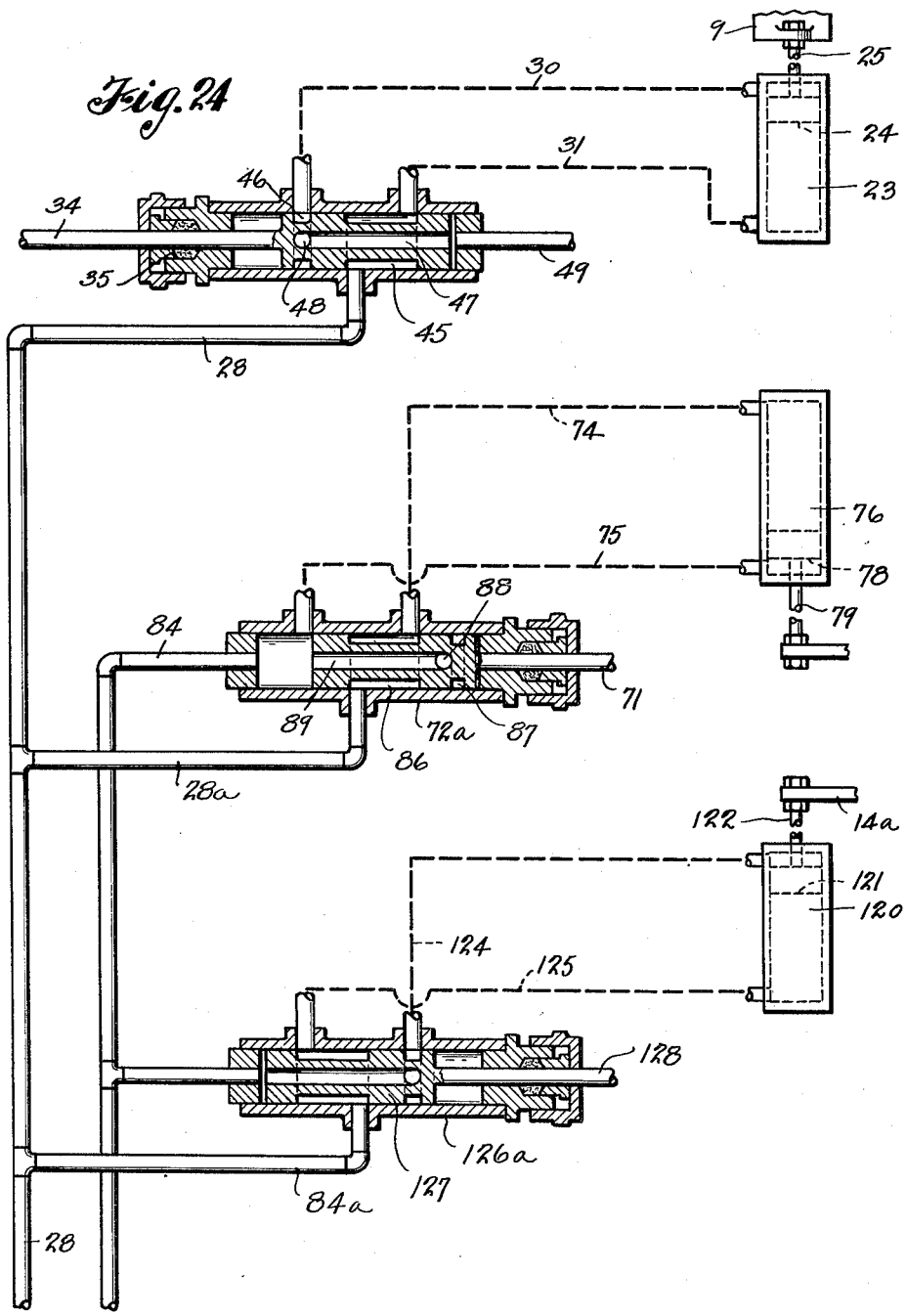
INVENTORS
OLIVER P.M. GOSS
WORTH G. GOSS
BY
Cook & Robinson
ATTORNEY Patented Sept. 11, 1934

1,973,204

UNITED STATES PATENT OFFICE 1,973,204

BORING MACHINE

Oliver P. M. Goss and Worth C. Goss, Seattle, Wash., assignors to Carlisle Lumber Company, a corporation of Washington Application December 20, 1933, Serial No. 703,227

14 Claims. (Cl. 144—110)

This invention relates to wood boring machines and more particularly to machines designed for use in practicing a certain method for the improvement of lumber which includes removal of knots and other defects from the lumber preparatory to the application of patch pieces thereto.

Lumber, as manufactured for commercial use, is graded or classified in accordance with the number of defects such as knots, stains, pitch pockets, etc., which it contains; the most common defects being small knots. Thus, in many instances, a board or plank of excellent quality otherwise is consigned to a lower classification or grade by reason of its containing one or more knots. First grade lumber, that is, lumber that is comparatively free of defects, is of greater value than second or third grade lumber and therefore, as disclosed in our prior applications now pending under Serial No. 667,219 filed April 21, 1933 and Serial No. 670,090 filed May 9, 1933, we have devised ways and means for the improvement of lumber of the lower grades which contemplates the routing out of defects and the application of wooden patch pieces thereto of matched grain and color in a manner whereby the defects are eliminated and added strength is given the lumber, thus raising it to the higher grades.

The routing machine of our prior application Serial No. 670,090, comprises a rotary cutter head with pointed cutter teeth and it has been found that knots in the lumber are a cause of great damage to these cutters. Therefore, it is desirable that they be removed by other means prior to the routing operation.

In view of the above, it has been the principal object of this invention to provide a boring machine whereby knots of various sizes may be easily, readily and speedily removed from lumber preparatory to forming the patch pockets therein.

It is also an object of this invention to provide a boring machine employing cooperatively acting wood boring bits in axial alinement adapted to enter the piece from which the defect is to be removed alternately from opposite sides, thus to bore out the defect in a manner that will avoid splintering either surface. Also, to provide novel control mechanism whereby the clamping of the piece for boring, the reciprocal action of the bits, and finally the releasing of the piece is automatically timed and carried out after being manually set into operation.

Another object is to provide wood boring bits of stepped diameters and an automatic control means whereby the bits will be advanced definite distances to bring corresponding parts of desired diameter into functional position, dependent upon the size of the knot or its angular direction through the piece.

Another object of the invention resides in the provision and use of a light beam for aiding in locating the piece of lumber accurately in position relative to the drilling bits for removal of the defect therefrom.

Other objects of the invention reside in the details of construction and combination of parts and in their mode of operation, as will hereinafter be described.

In accomplishing these and other objects, we have provided the improved details of construction the preferred forms of which are illustrated in the accompanying drawings, wherein—

Fig. 5 is a horizontal section on line 5—5 in Fig. 1.

Fig. 12 is a central, longitudinal sectional view of one of the pressure medium control valves.

Fig. 13 is a plan or top view of the starting valve and its control mechanism.

Fig. 14 is an enlarged front elevation of the same a part being in cross section for better illustration, as taken on line 14—14 in Fig. 13.

Fig. 15 is an enlarged, side elevation of a part of the automatic valve control mechanism.

Fig. 16 is a top, or plan view of the same.

Fig. 17 is a fragmental view showing the valve lever latch.

Fig. 18 is an end elevation of the parts shown in Figs. 15 and 16.

Fig. 19 is a sectional view on the line 19—19 in Fig. 15.

Fig. 20 is a cross section, on line 20—20 in Fig. 16.

Fig. 23 is a perspective view, diagrammatically illustrating the piping and valve mechanism for controlling the application of pressure medium to the hydraulic cylinders for actuating the boring units and clamp.

Fig. 24 is a sectional view, diagrammatically illustrating the valve devices.

Figure 1:
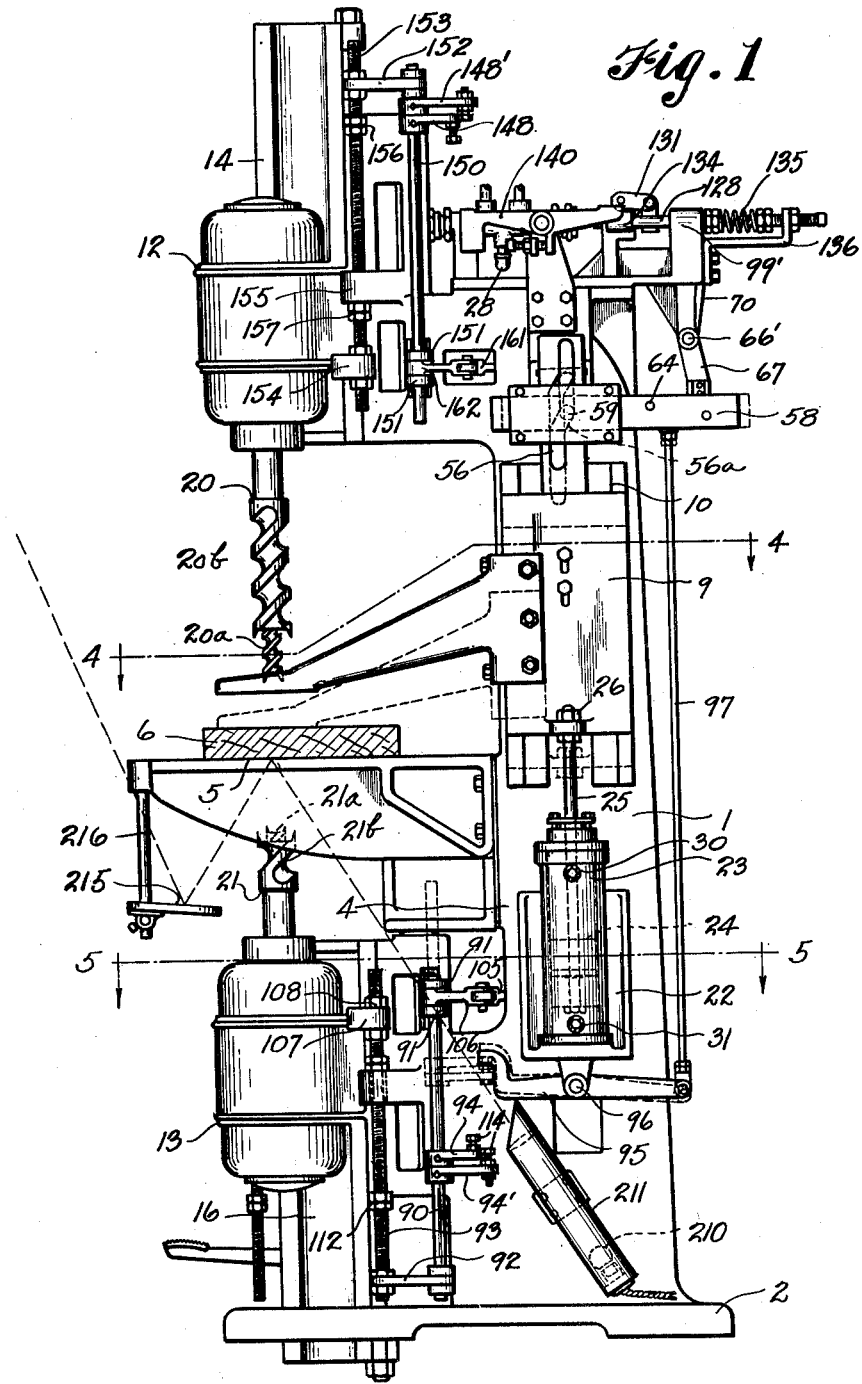
Fig. 1 is a side elevation of the machine, with the wood boring bits and the board clamp in retracted positions preparatory to an operation.

Briefly described, the present machine comprises a table across which a piece to be bored may be placed. A clamping arm is arranged to hold the piece on the table during a boring operation and above and below the table are boring units with boring bits in axial alinement and adapted to enter the board from upper and lower sides. The bits are electrically driven and the boring units are bodily raised and lowered by hydraulic means to which pressure medium is admitted under control of an automatic valve mechanism in such manner that the lower bit will enter the piece only slightly, then will be withdrawn and the upper bit advanced through the piece. Thus splintering of the under side of the piece is avoided. Manually controlled means is provided for starting the machine and then its operations are automatically controlled and timed and the machine stopped at the completion of an operation in position for another like operation.

Referring more in detail to the drawings—

The various parts embodied in the operating and control mechanism of the machine are mounted on a main frame structure in the form of a hollow casting comprising a vertical standard 1, with an integrally cast laterally projecting base flange 2. At the upper end of the standard is a horizontally extending head portion 3 spaced from and directly above a base portion 4 that is integral with and extended laterally from the lower end of the standard. Bolted, or otherwise rigidly secured to the standard, between the head 3 and base 4 is a horizontal table 5 across which the boards or pieces to be operated on, as designated at 6 in Figs. 1 and 2, are disposed.

Figure 2:
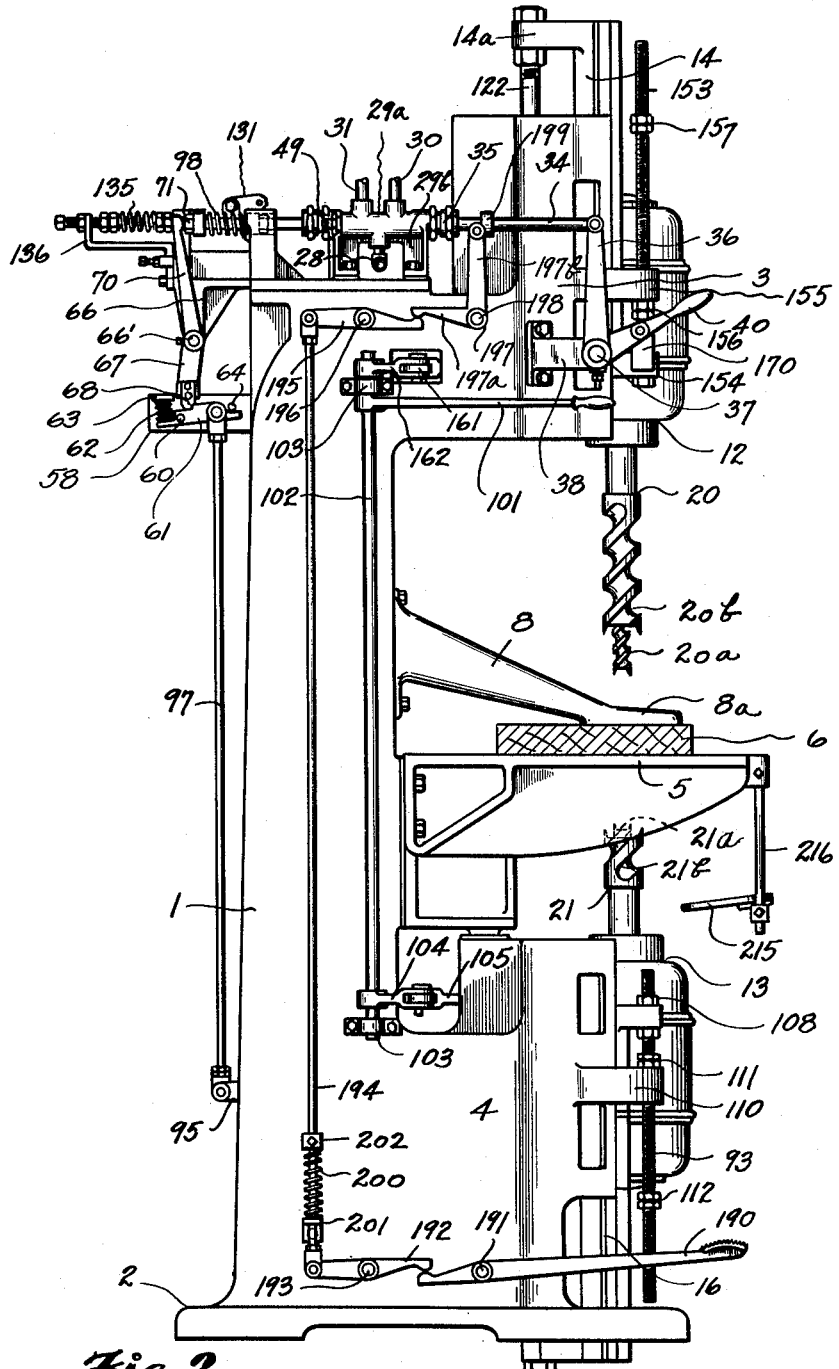
Fig. 2 is a side elevation of the same, as seen from the opposite side.

Overlying the table 5 is a board clamping arm 8 that is securely bolted at one end, as seen in Fig. 1, to a vertically movable slide 9. This slide has a sliding, dovetailed connection with a vertical key 10 integral with the standard 1, as seen best in Fig. 4, and it is designed to be moved downwardly from raised position, thus to clamp the outer end of the arm 8 against the board to hold the latter securely on the table for the boring operation, then to move upwardly to raise the arm and release the board for replacement or removal from the machine. The outer end of the arm 8 is bifurcated as observed in Fig. 4 and the two end sections 8a—8a thereof have flat, horizontal under surfaces at their ends for flatly engaging the board at equal distances oppositely from the axial line of the alined boring bits, as will presently be described. Also, the table 5 is formed with a recess 5a to provide necessary open space for passage of the bits through the board and to avoid interference with the spotting light beam which is directed against the under side of the board as will be presently described.

Located in vertical, axial alinement above and below the table 5, respectively, are boring units consisting of electrically driven motors 12 and 13 of standard construction each with its shaft designed to mount a boring bit coaxial thereof. The motor 12 of the upper unit is fixed upon a slide 14 having a dovetailed, keyed mounting as at 15 in Fig. 3, on the outer end portion of the head 3 to permit vertical travel of the unit. Likewise, the lower motor 13 is fixed on a slide plate 16 which has a dovetailed connection, as at 17, in Fig. 4, with the forward face of the base extension 4. The two motors are thus held perfectly rigid by their slides and the slides mount the motors for travel in exact axial alinement. The shaft of the upper motor mounts a wood boring bit 20 and the shaft of the lower motor likewise mounts a wood boring bit 21; these two bits having portions 20a and 21a at their ends, respectively of like diameter and portions 20b and 21b adjacent thereto of larger diameter. These two diameters provide for boring holes of two different diameters. Also, as will be observed in Figs. 1 and 2, sections 21a and 21b of the lower bit are relatively short while the sections of the upper bit are relatively long; it being intended that the lower bit be used only to cut through the under surface of a board to an extent sufficient to avoid splintering that surface when the upper bit is subsequently driven downwardly through the piece. Thus, the lower sections are short and the upper bit sections are made of sufficient length to bore clear through the piece.

At the start of an operation, and also at the completion thereof, the boring units will be in retracted positions, that is, the upper boring unit and the clamping arm will be raised and the lower boring unit will be lowered.

After a board has been located on the table 5 in proper position relative to the bits for boring out a defect therein, the clamping mechanism is set in motion by actuation of a control lever, later described. The mechanism operates first to cause the ends 8a of the clamping arm to be brought down firmly against the board. The arm 8, as seen in Fig. 1, is attached to the slide 9 and this slide is raised or lowered to hold or release the board by a hydraulic cylinder mechanism that is supported by a bracket 22 fixed to the side of the standard.

The hydraulic mechanism comprises a vertically disposed cylinder 23 containing a piston 24 having a rod 25 extended upwardly therefrom through the end wall of the cylinder and attached by nuts 26 to the lower end of the slide 9. The piston 24 is selectively actuated upwardly or downwardly in the cylinder by application of pressure medium to the opposite ends of the cylinder. The pressure medium for operation of this mechanism, and others later described, is delivered from a source of supply through a supply pipe 28 which connects through a valve mechanism designated in its entirety by reference numeral 29, with pipes 30 and 31 which lead, respectively, to the upper and lower ends of the cylinder as observed best in Fig. 23.

Through manipulation of the valve mechanism 29 the pressure medium from pipe 28 may be admitted into the upper end of the cylinder through pipe 30 for lowering the clamping arm, or through pipe 31 to the lower end of the cylinder for raising the arm. The valve mechanism 29 is located upon the upper end of the standard 1, see Figs. 2, 3 and 12, and it comprises a cylindrical valve housing 29a having a base flange 29b that is bolted to the standard to hold the valve in a horizontal position. Contained slidably within the housing, as illustrated in Fig. 12, is a valve piston 33 having a shifting rod 34 extended therefrom through a packed gland 35. This rod connects pivotally at its outer end, with the upper end of a lever arm 36 which is fixed on a short supporting shaft 37 revoluble in a bracket 38 that is mounted on the standard 1 as seen in Fig. 2. The shaft 37 has a forwardly extended hand lever 40 fixed thereto adapted to be moved upwardly or downwardly to shift the valve 33 inwardly or outwardly. The valve 33, as seen in Fig. 12, is formed with an elongated encircling recess 45 about one end and a relatively short encircling recess 46 about the other end. There is also a longitudinal bore 47 extended into the valve from the end opposite the actuating rod and this communicates through a diametric bore 48 with the annular channel 46. The end of the valve housing, opposite the shifting rod, is provided with a nipple 49' whereby connection is made with a pipe 49 through which pressure medium is exhausted from the cylinder.

With the valve and its associated parts thus arranged it is apparent by reference to Fig. 2, that when the hand lever 40 is pulled downwardly the valve 33 will be shifted from the full line position of Fig. 12 to the dotted line position. The pressure medium will then be permitted to enter from pipe 28 and pass through valve recess 45 to the pipe 30 and from this pipe will be admitted to the upper end of the hydraulic cylinder 23, thus to move the piston 24 downwardly. Downward movement of the piston effects a like movement of the slide 9 thus causing the ends of the clamping arm 8 to be brought against the board 6 to hold it firmly on the table for the boring operation.

On completion of the boring operation there is an automatic readjustment of the valve mechanism, described later, whereby the valve piston 33 is moved back to the original position, as in full lines in Fig. 12, thereby permitting the pressure medium to be admitted from the supply pipe 28 through the channel 45 to the pipe 31 whereby it is delivered into the lower end of the hydraulic cylinder 23 to raise the clamping arm. As the piston is lifted, the pressure medium contained in the upper portion of the cylinder is exhausted by passing through pipe 30, channel 46, bore 48, longitudinal bore 47 and finally to the exhaust pipe 49.

After the board that is to be operated on has been located and clamped securely on the table by the pressure thereagainst of arm 8, the lower boring unit then moves upwardly to cause the bit 21 of the lower unit to cut to a definite depth into the board as a means of preventing its being splintered by the upper bit when the latter is subsequently driven down through the board. The functional movement of the lower boring unit is synchronized with movement of the clamping arm and is automatically started by mechanism controlled through a connection with the slide 9. By reference to Fig. 1, it will be seen that there is a flat plate 54 adjustably fixed by bolts 55 to the upper end of slide 9 to extend upwardly therefrom. This plate has a longitudinal cam slot 56 therein, the upper end portion of the slot being laterally offset from the lower portion and the two parts are connected by a laterally inclined portion 56a. Mounted in a guide 57 attached to the frame standard is a horizontally disposed slide 58 which mounts a cam roller 59 contained in the slot 56 so that movement of plate 54 downwardly with the downward movement of the slide 9 incident to the arm 8 being adjusted to clamped position against a board, will cause the travel of roller 59 from within the lower end portion of slot 56 into the upper end portion thereof, and thus will cause the slide 58 to be shifted outwardly a distance equal to the offset of the slot.

Pivotally attached to the outer end portion of slide 58 by a pivot member 60, as seen best in Figs. 15, 16 and 17, is a latch 61 which is yieldingly supported in substantially horizontal position, as seen in Fig. 15, by a short coiled spring 62 which seats against a lug 63 on the slide 58 and the outer end of the latch. The inner end of the latch is adapted to rest against a stud 64 fixed in the slide to limit upward pivotal swinging of its inner end. This latch is provided in the upper edge of its inner end portion, with a notch 65. Fixed to the frame above the slide 58 is a bracket 66 in which a pivot shaft 66' is revolubly contained, as seen in Fig. 18. On one end of shaft 66' is a downwardly extended lever arm 67 which, at its lower end, has a latch tooth 68 adapted to engage the latch 61 within the notch 64. At the other end of shaft 66' is an upwardly extended arm 70, the upper end of which, as observed in Fig. 2, rests against the actuating stem 71 of a control valve mechanism 72 which controls the raising and lowering of the lower boring unit.

Figure 3:
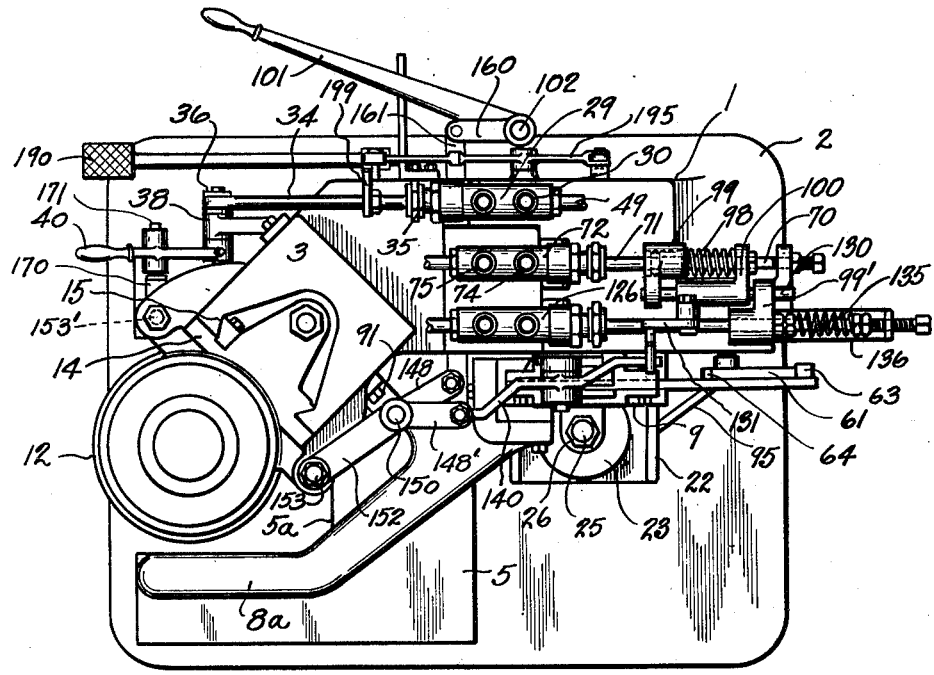
Fig. 3 is a top, or plan view of the machine.
Figure 6:
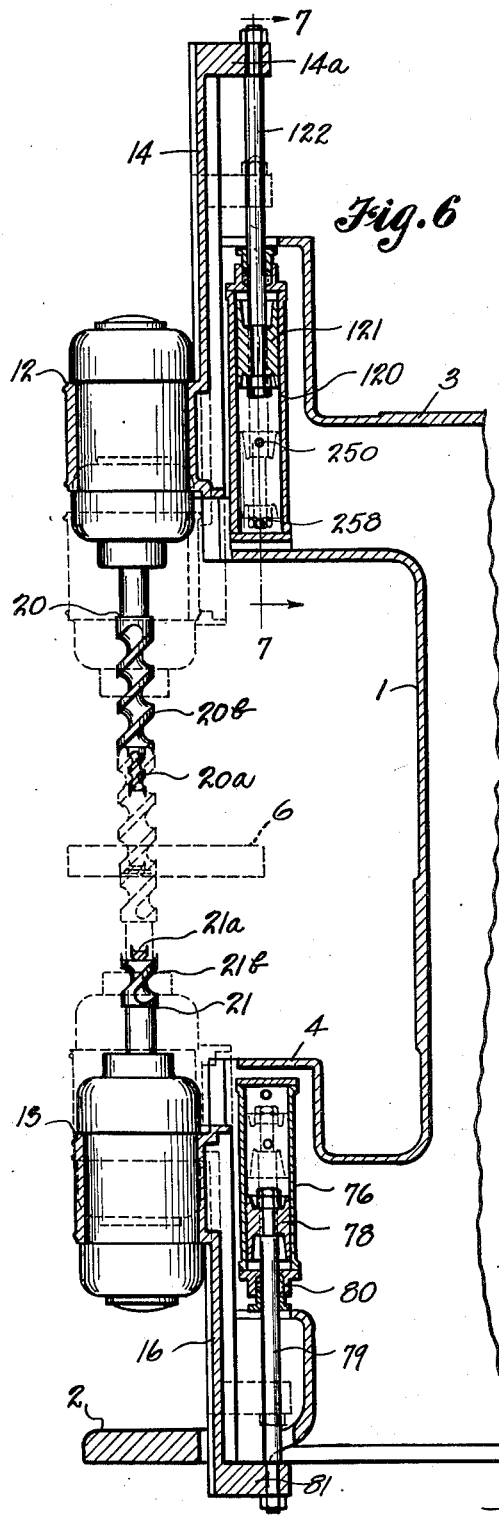
Fig. 6 is a vertical, sectional detail as on line 6—6 in Fig. 5 illustrating longitudinal movements of the bit driving motors and the hydraulic means for effecting their movements.
Figure 7:
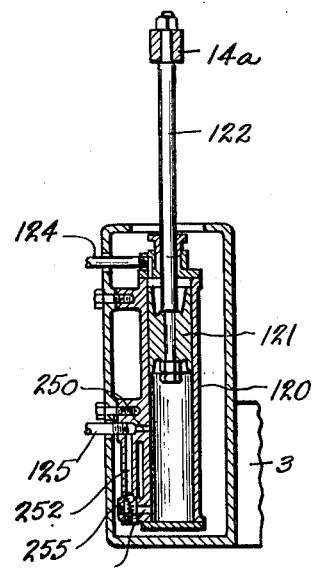
Fig. 7 is a cross section on line 7—7 in Fig. 6 illustrating the means of support for the upper hydraulic cylinder and also its valve arrangement and pipe connections.
Figure 22:
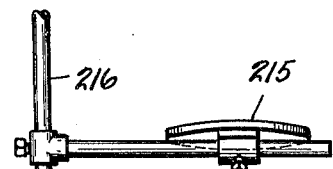
Fig. 22 is a detail of the light beam reflector and its supporting bracket.
Figure 21:
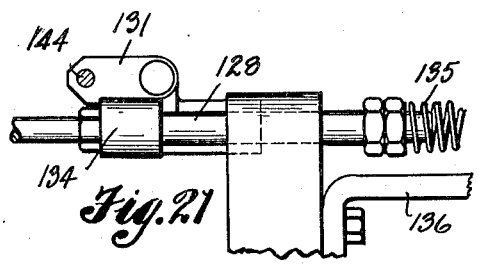
Fig. 21 is a detail of the valve latch mechanism.

The valve mechanism 72 is like valve 29 and is fixed on the upper end of the frame along side of valve 29, but is reversed relative thereto, as will be observed by reference to Figs. 3 and 23. In its operative construction it is like valve 29 as seen in Fig. 12, and it has a pipe connection 28b with the pressure medium supply pipe 28 and has pipes 74 and 75 leading therefrom respectively to the upper and lower ends of a hydraulic cylinder 76 that is fixed within the lower end portion of the frame standard, as seen in Fig. 6, to control the raising and lowering movements of the lower boring unit. The cylinder 76 has a piston 78 contained therein with a piston rod 79 extended through a packed gland 80 in the lower end of the cylinder and connected with a lateral lug 81 on the lower end of slide 16. When pressure medium is admitted to the lower end of the cylinder 76 it actuates the piston upwardly and the boring unit is lifted. Pressure applied to the upper end actuates the unit downwardly.

The interior structure of valve 72 is like that of valve 29. As seen in Fig. 24 it comprises a housing 72a with a base opening for pressure supply pipe 28a and it has upper openings in spaced relation and at opposite sides of the base opening for receiving the pipes 74 and 75, and it has an end opening for connection with an exhaust pipe 84. The valve slide 85 is actuated by its stem 71 and it has an annular channel 86 to provide at different positions of the slide for communication between pipes 28a and pipes 74 or 75. It also has a relatively short encircling channel 87 connected by a diametric bore 88 with a longitudinal bore 89 leading to the outlet end and pipe 84.

Assuming that at the start of an operation the parts associated with valve 72 are as illustrated diagrammatically in Fig. 24, it is apparent that the pressure medium from pipe 28 will then be applied through the valve to the upper end of cylinder 76 and the lower boring unit will be held in lowered position. Then, after the clamping arm 8 has been actuated against the board, and incident to the downward travel of the slide 9, the slide 58 is shifted outwardly and through the connection of lever 67 therewith, the lever 70 is swung inwardly against the valve rod 71 and valve slide 85 shifted inwardly as to the dotted line position of Fig. 24, the pressure medium will then be applied through pipe 75 to the lower end of the cylinder 76 to move the piston 78 upwardly thereby to lift the lower boring unit for the boring operation. At a definite point of upward travel of the boring unit, which causes a selected length of the bit 21 to enter the board, the valve slide 85 is moved back, as presently described, and the boring unit is automatically returned to starting position.

The movement of the valve slide 85 for lowering the unit is effected by the following means.

As will be observed in Fig. 1, there is a vertically disposed shaft 90 supported at its upper end slidably and revolubly between spaced guides 91—91 fixed to the main frame. This shaft moves upwardly and downwardly with the lower boring unit by reason of a connection provided with the slide 16 through the mediacy of a bar 92 connected with a threaded shaft 93 that is movable with the boring unit. On the shaft 90 a pair of arms 94 and 94' are fixed to extend laterally therefrom in an angular relation as seen in Fig. 3; the arm 94 being higher on the shaft a distance equal to the extent of the bit 21a beyond the bit 21b. It is to be understood that there is to be a selective use of bits 21a and 21b in accordance with the size of the hole to be bored. When the smaller bit is to be used, it is arranged that when the boring unit has moved upwardly an extent to which the bit will have cut through the lower surface of the board, the arm 94 will have moved up into engagement with the inner end of a horizontally disposed trip lever 95 mounted by a pivot 96 on the under side of a bracket 22. This lever is pivotally connected at its outer end to a pull rod 97 that extends upwardly therefrom and is pivotally attached to the inner end of latch 60. When the lever 95 is engaged by the arm 94, it is rocked in a manner to pull down on the latch to release it from the lever arm 67 thereby to disconnect the operative connection then existing between the lever 67 and slide 58. This disconnection permits a coiled spring 98, that is disposed about the valve stem 71 to expand and thereby actuate the valve slide 85 outwardly. This spring 98 is seated at one end against a fixed abutment 99 and at its other end bears against a bracket member 100 carried on the valve stem 71.

It is to be understood that if it is desired that the larger section 21b of the boring unit 21 be driven into the board, then the shaft 91 would be rotatably adjusted to a position for locating the arm 94' in position to engage the trip lever 95 when shaft 90 moves upwardly and since this arm 94' is set a definite distance lower on the shaft 90 than arm 94, the lever 95 will not be tripped until the larger bit section 21b has cut to the desired depth into the board.

Figure 4:
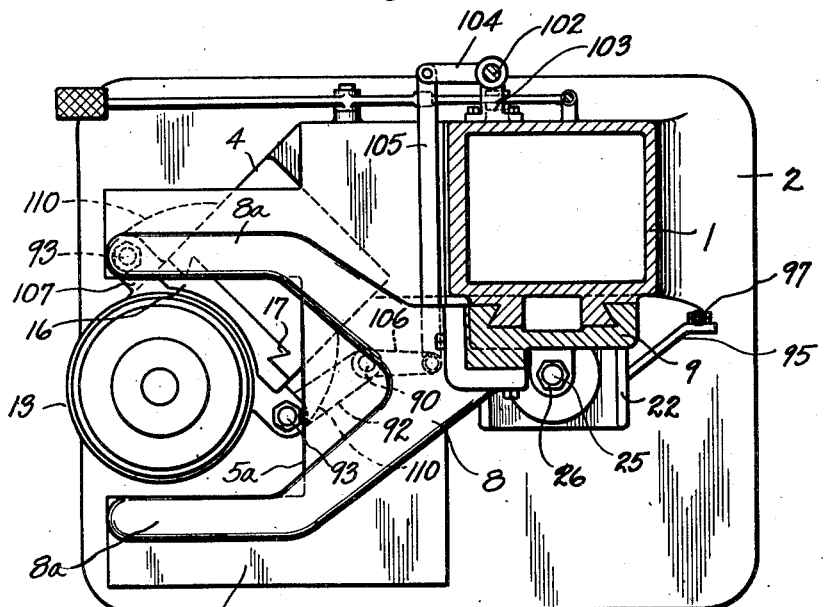
Fig. 4 is a horizontal section, taken substantially on line 4—4 in Fig. 1.

The adjustment of the shaft 90 for a selective use of bits 21a or 21b is effected by means of a hand lever 101 shown in Figs. 3 and 4 as fixed to a vertical shaft 102 revolubly supported at its ends in bearings 103—103'. Fixed on the lower end of the shaft is an arm 104 connected by a link 105 to an arm 106 keyed on shaft 90 between the guide supports 91—91. For the purpose of definitely limiting the upward and downward travel of the lower boring unit, we have provided the vertically disposed, threaded shafts 93 at opposite sides of the motor 13, as seen in Figs. 1, 2 and 4, and have secured these firmly in lugs 107, extending from opposite sides of the slide 16, by means of nuts 108. These shafts are slidable through lugs 110 extending from the base part of the standard 1 and they have nuts 111 and 112 threaded thereon to engage with the lugs 110 on downward and upward travel of the unit, respectively, to positively limit its travel. The shaft 90, as shown in Fig. 1, is connected for upward and downward movement with the lower boring unit by means of the horizontal bar 92 which is attached to the lower ends of the shaft 90 and shaft 93 at that side of the machine.

To provide for adjustment and for accuracy, in the depth of boring, the trip arms 94—94' are equipped at their ends with threaded studs 114 as seen in Fig. 1, for engagement with the trip lever 95.

The functional operation of the upper boring unit takes place immediately with the downward travel of the lower unit. The means for effecting the raising and lowering of the upper boring unit is similar to that for the lower unit. It comprises a hydraulic cylinder 120 fixed vertically within the head 3 of standard 1, as in Fig. 6, with a piston 121 connected by its rod 122 with a back turned lug 14a at the upper end of slide 14. Pressure medium is admitted from supply pipe 28 into upper or lower ends of the cylinder 120 through pipe connections 124 and 125 under control of a valve mechanism designated in its entirety at 126 which is automatically controlled in part by the spring 98. The valve mechanism 126 is substantially like that of valve 72 and it comprises the valve housing 126a fixed to standard 1 along side of and axially parallel with valves 29 and 72, and connected with the pressure supply pipe 28 by connection 28a through a central base port. It is also connected to the exhaust pipe 84 through an end port and fitting 84a. The valve piston 127 has a stem or rod 128 extended in the same direction of and beyond the stem 71 of valve 72. The interconnection between the operating mechanisms of valves is best shown in Figs. 15, 16 and 17. By reference to Fig. 16, it will observed that the bracket 100 fixed on the valve stem 71 of valve 72 is slidably supported on a guide rod 130 carried at one end in the fixed member 99 and at its other end in a similar support 99'. A latch 131 is pivotally attached at one end by bolt 132, as seen in Fig. 15, to a laterally extended arm of the bracket 100 and is disposed with its free end overlying a lug 134 fixed on the valve rod 128. A coiled spring 135 is located between the outer end of stem 128 and a fixed support 136 and this spring, when allowed to expand, will move the valve stem 128 inwardly.

At the start of any operation, the parts are as shown in full lines in Fig. 16, but when the downward travel of the clamping arm 8 has effected the outward shifting of slide 58 and has thereby actuated the lever arm 70, to shift the stem 71 of valve 72 inwardly and at the same time has moved the bracket 100 along the guide rod 130, this will have placed the spring 98 under compression and also moved the latch 130 inwardly to the dotted line position of Fig. 15 at which a tooth 130' at its end hooks over the inner end of the lug 134 on the stem 128. Then, when the upward travel of the lower boring unit has, by rocking of the lever 95, effected the release of the latch 60 from the lever 67, the spring 98 will expand and will thereby move the valve stem 71 outwardly to so adjust the valve slide 85 of valve 72 that pressure medium will flow to cylinder 76 to cause lowering of the lower unit and will at the same time shift the bracket 100 outwardly, causing latch 131 to pull the valve stem 128 outwardly and thereby divert pressure medium through valve 126 to the upper end of cylinder 120 and cause a downward travel of the upper boring unit.

It will be explained here that the strength of spring 98 is greater than that of spring 135 so that it will actuate the valve stem 128 outwardly against the pressure of spring 135. However, the strength of spring 135 is sufficient that it will move its valve stem 128 inwardly when spring 98 is not acting against it.

The upper boring unit 12 moves down a definite distance which is sufficient to drive the selected portion of the boring bit through the piece of lumber, then its direction of travel is reversed, incident to the operation of a trip mechanism which releases the latch 131 from lug 134 and allows the spring 135 to move the valve slide of valve 126 inwardly and cause the pressure medium then to be diverted through the valve into the lower end of cylinder 120. This trip mechanism is shown in Figs. 1, 15 and 18 and comprises a rocker lever 140 mounted by a pivot 141 on a bracket 142 fixed to the standard. One end of the lever 140 underlies a stud 144 extending from the latch 131. The other end of the rocker extends to a position at which it will be engaged and downwardly rocked by one or the other of two trip arms 148—148' fixed on a vertical shaft 150 that moves upwardly and downwardly with the boring unit. The shaft 150 is rotatable and slidable at its lower end within spaced guide bearings 151 fixed to the standard and at its upper end has a fixed connection through a bar 152 with a shaft 153 which, in turn, is fixed at its lower end to a lug 154 on the slide 14. Shaft 153 is slidable through a lug 155 on the standard head and has nuts 156 and 157 for engaging the lug to limit the upward and downward travel of the unit.

The arms 148 and 148' are fixed on shaft 150 in angular divergence and one is located above the other a distance equal at least to the length of bit section 20a beyond bit section 20b, and by rotation of the shaft 150 to different positions, one or the other arm may be located in a position at which it will operatively engage the rocker lever 140 to disengage latch 131 from lug 134 and thereby allow the spring 135 to push valve stem 128 inwardly to so adjust the valve 126 as to cause the pressure medium then to be diverted into the lower end of cylinder 120 and thereby to lift the unit back to starting position.

The setting of shaft 150 is simultaneous with the setting of trip shaft 90 of the lower unit and is effected by a connection with shaft 102 consisting of an arm 160 fixed on shaft 102 and connected by a link 161 with an arm 162 on shaft 150.

As the upper boring unit travels upwardly and finally moves to its normal raised position, a lug 170 carried with a shaft 153' which is connected to raise and lower with the unit, as shown in Figs. 2, 13 and 14, engages with a yieldable stud 171 carried by the hand lever 40 and causes the lever 40 to be swung back to its raised position. This movement of the lever causes a resetting of valve 29 and effects the diverting of the pressure medium through this valve to the lower end of cylinder 23, thereby to raise the arm 8 to release the board 6 for readjustment or removal. The stud 171, as seen best in Fig. 14, is held extended by a spring 175 resting against a collar 176 on the stud and against an end of the pocket 177 on the lever in which the stud is slidably contained. The outer end of the stud is slightly beveled as at 178 and engages a beveled shoulder 179 on the lug. The spring has sufficient strength to hold the two in contact for resetting the lever and valve but it will yield to permit the lever to be pulled downwardly at the start of an operation.

For convenience in operation, there is also provided means for foot control. This is illustrated in Fig. 2 wherein a foot pedal 190 is pivoted by stud 191 near the base of the frame. The inner end of the lever rests against the under side of a rocker 192 fixed by stud 193 to the frame. A rod 194 connects rocker 192 with a rocker 195 pivoted by stud 196 to the upper end of the standard and the rocker 195 operatively engages one arm 197a of a bell crank 197 mounted by pivot stud 198. The other arm 197b of the bell crank has an operative bearing against a collar 199 on the valve rod 34 whereby downward pressure on the foot pedal will actuate the valve outwardly in a manner like that obtained by pulling downwardly on the hand lever 40. Thus, the device may be either hand or foot controlled at the option of the user. A coiled spring 200 returns the parts to position when pressure is removed from pedal 190.

For the purpose of accurately locating a board on the table so that the defect to be removed will be centered relative to the axis of the boring bits, there is provided a source of light 210 in a housing 211 fixed to standard 1, as shown in Fig. 1, which is directed in a narrow beam by suitable reflectors or lens against the under side of the board at the point of intersection of the axial line of the boring bits and the horizontal plane of the table on which the board rests. A looking glass or reflector 215 is held by a bracket 216 attached to table 5 in position that an operator in normal working position may easily observe in the glass the light spot as directed against the under side of the board, and by shifting the board until the spot is coincident with the defect to be removed, will thereby accurately locate the defect relative to the boring bits.

Figures 8, 9, 10, 11:
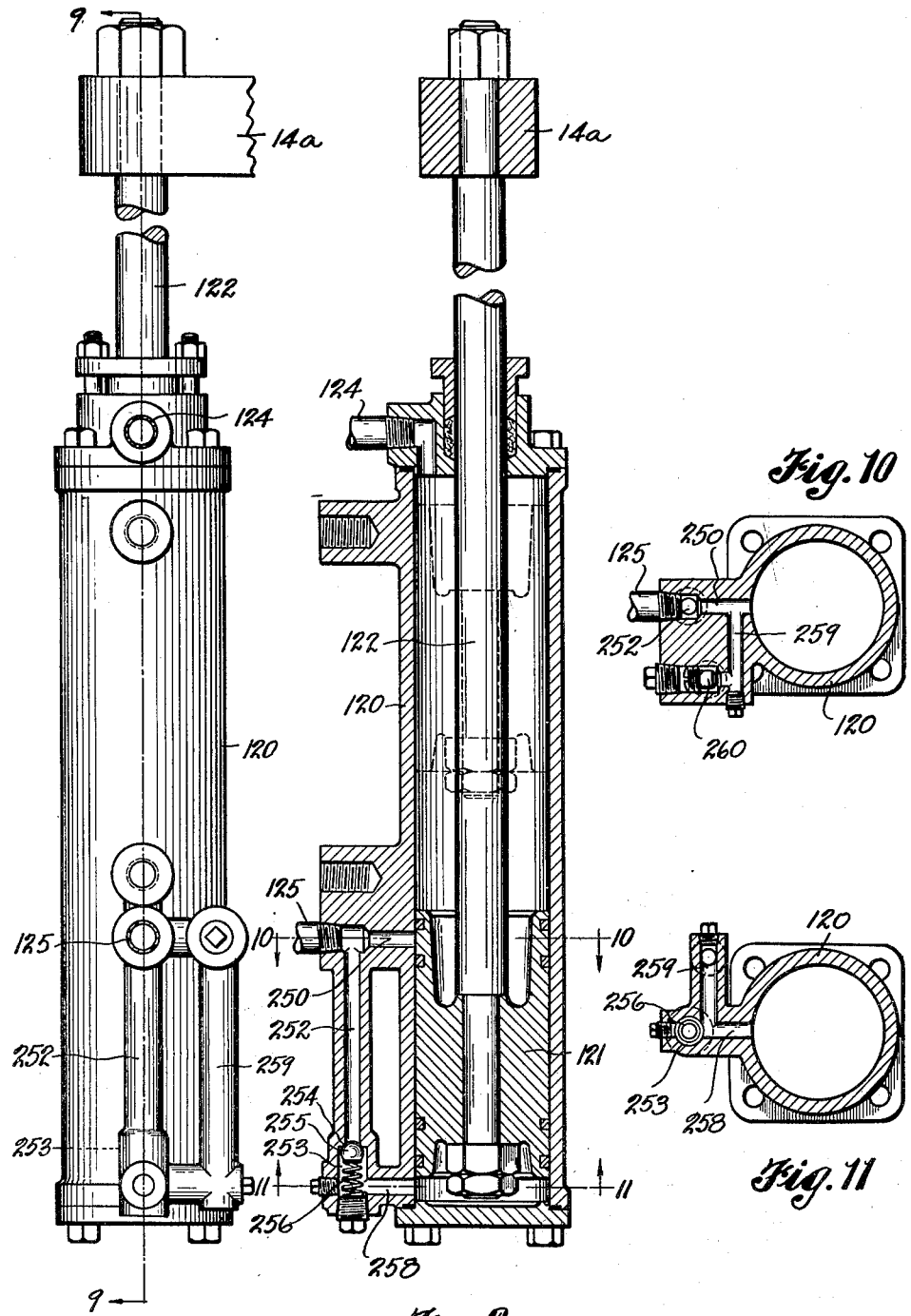
Fig. 8 is a front elevation of the hydraulic cylinder for actuating the upper boring unit in its vertical movements.
Fig. 9 is a cross section of the cylinder on line 9—9 in Fig. 8.
Fig. 10 is a horizontal section on line 10—10 in Fig. 9.
Fig. 11 is a horizontal section on line 11—11 in Fig. 9.

A feature of the invention, as disclosed in Figs. 8, 9, 10 and 11 resides in the provision of valve mechanism in the cylinders 76 and 120 whereby the movement of the boring units is slowed down during the boring operation. This rate of movement is controlled by the rate at which the pressure medium is permitted to be exhausted from the hydraulic cylinders. This is explained in these figures with reference to cylinder 120 but applies also to cylinder 76. It is observed that pipe 125 connects directly with cylinder 120 through an opening 250 located at a spaced distance above the lower end of the cylinder. Also, there is a channel 252 leading from channel 250 downwardly into a valve chamber 253 past a valve seat 254 against which a ball valve 255 is yieldingly held seated by a spring 256. At its lower end, the chamber 253 has a channel 258 leading directly into the cylinder at its lower end. Also there is a by-pass channel 259 connecting the channels 250 and 258 and, as shown in Fig. 10, there is a threaded plug 260 extending into the channel 259 and restricting the passage in a manner whereby the outflow from the lower end of the cylinder through channel 250 will be reduced the degree desired, determined by the setting of the plug 260.

It is apparent that when the pressure medium applied to the cylinder through pipe 124 drives the piston 121 downwardly to lower the boring unit, it will have a desired freedom of movement because of the easy outflow of liquid from below the piston through port 250. However, as soon as the piston has closed over the outlet 250, the outflow of liquid is through the restricted by-pass channel 259 and the rate of lowering of the unit is materially reduced.

When pressure medium is applied through pipe 125 to lift the piston for returning the boring unit to raised position, it passes directly to the lower end of the cylinder through channel 252 and past the ball check valve 255 and the rate of lifting is quick by reason of the unrestricted outflow from the upper end through pipe 124.

Having thus described our invention, what we claim as new therein and desire to secure by Letters Patent is

1. A boring machine comprising a supporting table across which a board may be slidably adjusted to positions for boring, boring units having bits in axial alinement perpendicular to the plane of the table and adapted to enter the board when in position for boring, respectively, from opposite sides, and means whereby the bit of one unit is caused to bore part way through the board from one side, then to be retracted therefrom, and the bit of the other unit caused to enter the object from the opposite side to complete the bore therethrough.

2. A boring machine comprising a horizontal supporting table across which a board is slidably movable to different positions for boring, boring units, with bits in axial alinement and perpendicular to the plane of the table and adapted to enter the board when in position for boring, respectively, from opposite sides, a clamp member operable against the object to secure it on the support, and means for actuating the units whereby the bit of one is caused to bore into the board a limited distance then to be retracted and the bit of the other unit caused to bore into the board from the opposite side to complete the bore therethrough.

3. A boring machine comprising a horizontal supporting table across which a board may be slidably moved to different positions, a movable clamp member for holding the board against movement on the support, boring units at opposite sides of the support with bits in axial alinement and perpendicular to the plane of the table adapted to enter the object from opposite sides, means for driving the bits, and power devices manually set in motion and operable in succession for actuating the clamp against the board for moving one boring unit to cause its bit to bore partially through the object from one side and to be retracted; for moving the other boring unit to drive its bit into the object from the opposite side to complete the bore therethrough and then to be retracted.

4. A boring machine comprising a supporting table for an object to be bored, a movable clamp arm overlying the table, boring units movably mounted below and above the table and having boring bits in axial alinement and adapted, respectively, to enter the object from opposite sides, means associated with each unit for driving its bit, a power device for moving the clamp arm against and from the object, a power device for each boring unit and a control mechanism whereby the said power devices for moving the clamp arm and boring units may be caused to operate in timing first to cause the clamp arm to be actuated against the object to secure it on the table, then the bit of one boring unit to bore partially into the object and be retracted, then the bit of the other unit to complete the bore through the object from the opposite side, and to be retracted and finally the clamp arm to be moved from the object.

5. A boring machine comprising a table for supporting an object to be bored, a movable clamp arm overlying the table, separate boring units above and below the table having bits in axial alinement and adapted, respectively, to enter the object from opposite sides, means associated with each unit for driving its bit, a power device for actuating the clamp arm against an object to secure it on the table during an operation thereon, a power device for actuating the first boring unit to cause its bit to be advanced partly through the object and to be retracted therefrom, a power device for actuating the second unit to cause its bit to complete the bore through the object from the opposite side and to be retracted therefrom, and interconnected control devices for the three mentioned power devices whereby movement of the clamp arm against the object automatically starts the operation of the first boring unit, and a predetermined movement of the second unit effects the retractive movement of the power device actuating the clamp arm.

6. A boring machine comprising a frame structure, a table fixed therein for the support of an object to be bored, a clamp arm movably mounted on the frame and operable against and from an object on the table, a fluid pressure device for actuating the arm, boring units mounted movably on the frame above and below the table, respectively, with boring bits in axial alinement and adapted to enter the object from opposite sides, a fluid pressure device for actuating each unit, a source of fluid pressure medium, individual control valves for said pressure devices, connected with said source of pressure medium, manually actuated means for setting the control valve for the first mentioned hydraulic means to cause the clamp arm to be actuated against the object, means operable incident to a predetermined movement of the arm to actuate the control valve of the hydraulic means of one boring unit to cause movement of the unit whereby its bit is driven partly through the piece, means for automatically reversing the valve after a predetermined travel of the unit to cause retraction of the bit, and for actuating the control valve of the other unit to cause movement thereof whereby its bit will bore through the piece from the opposite side and means actuated incident to a predetermined movement thereof for automatically reversing the valve to return the unit to initial posiiton.

7. In a boring machine, a frame structure, a table fixed therein for the support of an article to be bored, a clamp arm overlying the table, a hydraulic cylinder fixed in the frame having a piston operatively connected to actuate the clamp arm, a boring unit movably mounted on the frame, a hydraulic cylinder fixed in the frame and having a piston connected to actuate the unit to and from boring position, a source of pressure medium, valve devices for individually administering pressure medium to the cylinders, manual means for adjusting the first valve to a position for effecting clamping movement of the arm, and means moved incident to the arm approaching its clamping position for actuating the second valve to cause the boring unit to be advanced for a boring operation and means for automatically reversing the last valve at the completion of the boring operation to return the unit to initial position.

8. In a boring machine, a frame structure, a table fixed therein for the support of an article to be bored, a clamp arm overlying the table, a hydraulic cylinder fixed in the frame having a piston operatively connected to actuate the clamp arm, a boring unit movably mounted on the frame, a hydraulic cylinder fixed in the frame and having a piston connected to actuate the unit to and from boring position, a source of pressure medium, valve devices for individually administering pressure medium to the cylinders, manual means for adjusting the first valve to a position for effecting clamping movement of the arm, and means moved incident to the arm approaching its clamping position for actuating the second valve to cause the boring unit to be advanced for a boring operation, a spring associated with the second valve and placed under compression by the said actuation of the valve, and means operable by the boring unit after a predetermined advance movement thereof to release the valve for return movement by said spring thereby to return the boring unit to initial position.

9. In a boring machine, a frame structure, a table fixed therein for the support of an article to be bored, a clamp arm overlying the table, a hydraulic cylinder fixed in the frame having a piston, operatively connected to actuate the clamp arm, a boring unit movably mounted on the frame, a hydraulic cylinder fixed in the frame and having a piston connected to actuate the unit to and from boring position, a source of pressure medium, valve devices for individually administering pressure medium to the cylinders, manual means for adjusting the first valve to a position for effecting clamping movement of the arm, a slide actuated by movement of the arm to clamping position, a rocker lever, a latch operatively connecting the slide and rocker lever, whereby the rocker is caused to actuate the second valve to cause advancement of the boring unit to effect a boring operation, a latch release device actuated by the unit after a predetermined movement thereof, and a spring for returning the second valve to initial position incident to release of the latch.

10. In a boring machine, a frame structure, a table fixed therein, a hydraulic device operatively connected to actuate the arm from and against an object placed on the table to be bored, a boring unit above the table, a boring unit below the table, hydraulic devices for individual actuation of the said units to effect boring into the object from opposite sides, a source of pressure medium for said devices, a valve associated with each device for application of medium thereto, a manual means for setting the valve of the first mentioned device to actuate the clamp arm against the object, means actuated incident to clamping movement of the arm to actuate the valve of the hydraulic device of one of said boring units to cause the unit to bore into the object, means operable to reverse the valve at a predetermined position of the unit to retract it and for actuating the valve of the other boring unit to cause the unit to bore through the object, means for reversing the latter valve on completion of the bore for retraction of the unit and means operable incident to the retractive movement for restoring the manual means to initial position and thereby to effect a retractive movement of the clamp arm.

11. In a boring machine, the combination with a support for an object to be bored and a movably mounted boring unit having a boring bit of stepped diameters, of means operable to move the unit in one direction to cause said bit to bore into an object on said support, a reversing means for reversing the direction of travel of the unit and devices corresponding to the different diameters of the bit selectively movable into position for actuating said reversing means thereby to limit the diameter of the bore to that of a selected diameter of the bit.

12. In a boring machine, the combination with a support for an object to be bored and a clamp movable against the object, of boring units located above and below the unit, respectively, with boring bits in axial alinement and adapted to enter the object from opposite sides; said bits each comprising sections of progressively stepped diameters, means for advancing the units to cause the bits to enter the object, a reversing means for each unit and devices movable with each unit, corresponding to the different sections of each bit, and selectively movable into positions for actuating said reversing means of the respective units to limit the bore to the diameter of a selected section.

13. A device as in claim 12 wherein the said devices are operatively connected for adjustment by a common adjusting lever.

14. In combination, a supporting table for a board or the like, a tool adapted to be moved in a definite line to engage the board located on the table, a source of light, means for causing rays of light therefrom to be concentrated on one face of the board at the point at which the tool in moving along its definite line will engage therewith and means positioned for reflecting said concentrated light on the board to an operator in position for directly observing the opposite face of the board.

OLIVER P. M. GOSS.
WORTH C. GOSS.